United States Patent [19]
Chick et al.

[11] Patent Number: 5,743,299
[45] Date of Patent: Apr. 28, 1998

[54] DUAL CONTAINMENT PIPE REHABILITATION SYSTEM AND METHOD OF INSTALLATION

[75] Inventors: Douglas K. Chick, Elstree, England; F. Thomas Driver, Memphis, Tenn.

[73] Assignee: Insituform (Netherland) B.V., Netherlands

[21] Appl. No.: 485,013

[22] Filed: Jun. 7, 1995

Related U.S. Application Data

[63] Continuation of Ser. No. 183,146, Jan. 18, 1994, Pat. No. 5,546,992.

[51] Int. Cl.⁶ ............................................. F16L 55/16
[52] U.S. Cl. .................. 138/98; 138/104; 138/111; 138/114; 73/49.1; 264/269; 156/287
[58] Field of Search ................... 138/98, 104, 114, 138/111, 103, 97, 113; 73/49.1, 49.5; 264/269, 516; 156/287

[56] References Cited

U.S. PATENT DOCUMENTS

| | | | |
|---|---|---|---|
| 3,655,224 | 4/1972 | Carberry et al. | 138/104 |
| 3,817,068 | 6/1974 | Dorgebray | 138/90 X |
| 3,882,382 | 5/1975 | Johnson | 138/104 |
| 4,064,211 | 12/1977 | Wood | 264/95 |
| 4,350,548 | 9/1982 | Zenbayashi et al. | 138/98 |
| 4,421,698 | 12/1983 | Vanderlans | 138/98 |
| 4,554,650 | 11/1985 | Brown et al. | 138/104 |
| 4,570,679 | 2/1986 | Schippl | 138/113 X |
| 4,571,986 | 2/1986 | Fujie et al. | 138/90 X |
| 4,646,787 | 3/1987 | Rush et al. | 138/98 |
| 4,681,783 | 7/1987 | Hyodo et al. | 138/98 |
| 4,691,740 | 9/1987 | Svetik et al. | 138/97 |
| 4,752,511 | 6/1988 | Driver | 138/98 |
| 4,770,462 | 9/1988 | Müller et al. | 138/97 |
| 4,836,715 | 6/1989 | Wood | 138/98 |
| 4,848,408 | 7/1989 | Foetmann et al. | 138/104 |
| 4,867,203 | 9/1989 | Jan de Putter | 138/98 |
| 4,867,921 | 9/1989 | Stekette, Jr. | 138/97 X |
| 4,984,605 | 1/1991 | Schippl | 138/113 X |
| 5,010,440 | 4/1991 | Endo et al. | 138/97 |
| 5,101,863 | 4/1992 | Fuji et al. | 138/98 |
| 5,127,441 | 7/1992 | Rains | 138/104 |
| 5,167,258 | 12/1992 | Rice | 138/98 |
| 5,172,730 | 12/1992 | Driver | 138/104 |
| 5,305,798 | 4/1994 | Driver | 138/98 |
| 5,358,358 | 10/1994 | Tassone et al. | 138/113 X |

*Primary Examiner*—Patrick F. Brinson
*Attorney, Agent, or Firm*—Cowan, Liebowitz & Latman, P.C.; Michael I. Wolfson

[57] ABSTRACT

A dual containment pipe system suitable for installation into an existing conduit includes an impervious containment pipe adapted to be installed as a primary containment pipe and a crush-resistant and flexible spacer element disposed about the entire external circumference of the primary containment pipe. The spacer is formed of a plurality of spaced apart and parallel substantially crush-resistant longitudinal members with a plurality of spaced apart parallel flexible connecting ribs bonded thereto. The longitudinal members form a uniform space when the containment pipe suitable for installation of leak detection systems including cables or based on measuring pressure differentials. The new impervious primary containment pipe may be cured in place, folded and formed, diameter reduced pipe, or any other pipe suitable for pipeline rehabilitation.

22 Claims, 5 Drawing Sheets

DUAL CONTAINMENT PIPE REHABILITATION SYSTEM AND METHOD OF INSTALLATION

This is a continuation of application Ser. No. 08/183,146, filed on Jan. 18, 1994, now U.S. Pat. No. 5,546,992.

BACKGROUND OF THE INVENTION

This invention relates to a dual containment pipe system for installation within an existing conduit, and more particularly to a dual containment pipe system which provides a uniform space between a new primary containment pipe and the existing conduit, or between the new primary containment pipe and a new secondary containment pipe if the existing conduit is in need of repair. The newly created space between the pipes is suitable for receiving a leak detection system.

There is continuing need to provide pipes and methods of installation for rehabilitating existing pipelines. Due to the fact that many existing conduits handle hazardous liquids, chemicals and petroleum products, and that such pipelines are often located underground, it is desirable to install leak detection systems to meet new environmental regulations and assure health and safety of present and future generations. In these situations it is preferable to be able to rehabilitate and retrofit existing conduits without having to excavate. One such two-wall leakage detection system for an existing conduit is disclosed in U.S. Pat. No. 5,172,730, which issued on Dec. 22, 1992 to one of the inventors herein, the contents of which are incorporated herein by reference.

While this existing two-wall pipe and leakage detection system is fully satisfactory, it utilizes a soft absorbent or felt-type material to form the annular space. One advantage is that it is suitable for retrofitting relatively long lengths of existing pipe. An alternative construction of a pipeline monitoring leak containment system is illustrated in U.S. Pat. No. 5,072,622 issued on Dec. 17, 1991 to Roach et al. The pipe system disclosed by Roach et al. includes a pipe having an exterior wall in tight engagement with the interior wall of the carrier pipe with at least one groove located in the exterior surface of the containment pipe. The groove and the interior wall of the outer carrier pipe define at least one passageway. While it is believed that this system is suitable for relatively short lengths, it is limiting in that the containment pipe need be of the substantially rigid type and tends to be expensive to form such grooves on a wide variety of pipes of different sizes. An advantage of this system is that the space formed in the groove should remain uniform along the length of the groove.

A well-known process for rehabilitation of existing conduits generally utilizing a flexible liner to be cured in place is the "Insituform®" method described in U.S. Pat. No. 4,009,063 and No. 4,064,211, the contents of which are incorporated herein by reference. Another rehabilitation process known as the "NuPipe®" process described in U.S. Pat. No. 4,867,921 and No. 5,255,624, the contents of which are incorporated here by reference. In this latter process a substantially rigid replacement pipe is installed in a flattened and folded shape, heated and expanded to the shape of the original conduit.

In the Insituform® method, the lining tube is everted into the existing conduit from one end, the lining tube being provided on its outer side with an impermeable coating or film which after eversion becomes the inner surface of the pipeline providing a smooth flow enhancing surface to the interior of the relined pipeline or passageway. While the Insituform® process is extremely viable for relining long lengths of existing conduits, it would not be suitable to provide grooves on the outer surface of such a liner if a dual containment configuration were desired. A separate body of absorbent material may be provided as in U.S. Pat. No. 5,172,730, identified above.

Accordingly, it is desirable to provide an improved dual containment pipe which is not limited to liners which are rigid or flexible prior to installation, and which will provide a substantially uniform annular space along the full length of the pipeline when installed.

SUMMARY OF THE INVENTION

Generally speaking, in accordance with the invention, a dual containment pipe system includes a primary impervious containment pipe suitable for installation into an existing conduit which after installation conforms to the interior configuration of the existing conduit and a substantially crush-resistant spacer disposed about the impervious primary containment pipe to form a uniform between the pipes space. The preferred spacer is extruded in tubular form. The spacer can be used in this tubular form. Alternatively, it can be split, either to be wrapped around the primary conduit pipe, or it can be configured onto a tube by any suitable fastening means and the primary containment pipe can be inserted within it.

The preferred spacer element is formed of a plurality of spaced apart and parallel longitudinal rods and a plurality of spaced apart parallel elongated flexible connecting ribs disposed at an angle to and crossing the longitudinal rods. The longitudinal rods are of substantially the same length as the segment of existing conduit to be lined with the dual containment pipe system. The connecting ribs and the longitudinal rods are bonded together and the spacer is sufficiently flexible to conform to the interior configuration of the secondary containment conduit. A leak detection system may be installed in the longitudinal space between the longitudinal rods.

The primary containment pipe may be any one of the various types of liners used to rehabilitate existing pipelines without excavation. Such liners may be of the cured in place flexible type, which includes a fibrous carrier disposed on one or between two impervious membranes. The carrier is impregnated with thermosetting resin mixed with catalyst and promoter and after inflation by internal pressure is cured in place. Alternatively, the primary containment pipe may be of a substantially rigid folded pipe which is inserted into an existing conduit in a reduced configuration and after rounding by application of heat and internal pressure is cooled to conform to the internal configuration of the existing conduit, a thermoplastic liner of the diameter reduction type, or any other acceptable rehabilitation system. The flexible type liners may be pulled into place or everted and the substantially rigid liners are pulled into place.

The dual containment pipe system in accordance with the invention may be installed in an existing conduit in a variety of ways. If the existing conduit is in need of repair, it is first repaired to provide a suitable secondary containment pipe. The existing conduit may be repaired by installing a flexible cured in place liner, a substantially rigid folded and formed pipe, diameter reduction pipe, or any other acceptable rehabilitation system. In all cases, this new liner becomes the secondary containment pipe structurally capable of carrying loads placed upon it, as is well known in the art. If the existing conduit is not in need of repair, the existing pipe becomes the secondary containment pipe in the dual containment system in accordance with the invention.

In accordance with one embodiment, the spacer is wrapped around the new primary containment pipe, whether it is flexible or rigid. The spacer and containment pipe are then pulled into the existing conduit or repaired existing conduit and the containment pipe is configured to conform to the interior configuration of the secondary conduit. The spacer and new primary containment pipe can be installed inside the existing conduit or repaired existing pipe simultaneously, or individually. When a flexible cured in place liner is utilized, the outer surface in contact with the spacer includes an impervious membrane so that any resin contained in the flexible carrier material will not migrate into the annular space.

Accordingly, it is an object of the invention to provide an improved dual containment pipe system for installation in existing conduits.

Another object of the invention is to provide a method of installation of a dual containment pipe system in an existing conduit.

A further object of the invention is to provide a dual containment pipe system having a substantially uniform space between the two pipes along the full length of the pipe system.

Still a further object of the invention is to provide an annular spacer suitable for use in a wide variety of dual containment pipes which may be installed in existing conduits.

Another object of the invention is to maximize the fluid carrying capacity of the existing fluid carrying pipe while providing the benefits of a dual contained system.

Still other objects and advantages of the invention will in part be obvious and all or part be apparent from the specification.

The invention accordingly comprises the several steps and the relation of one or more of such steps with respect to each of the others, and the pipe systems embodying features of construction, combinations of elements and the arrangement of parts which are adapted to affect such steps and constructions, all exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

A dual containment pipeline system constructed and arranged in accordance with the invention when installed in an existing conduit includes a uniform spacer which provides a uniform space particularly well-suited for placement of a leakage detection system. The dual containment pipe permits maximum flow through the existing conduit, is non-destructive and can be installed without excavation thereby avoiding the need to dispose of potentially contaminated excavation.

The dual containment system provides a uniform space between the pipes by positioning a substantially crush-resistant annular spacer about a new primary containment pipe. The primary containment pipe may be a flexible cured in place pipe, a folded and formed substantially rigid pipe, diameter reduction pipe, or any other acceptable rehabilitation system. In case the host pipe is not sound, or if it cannot act as a secondary container over the life of the pipeline, then it must be made sound. As in the case of the new primary containment pipe, the original conduit may be repaired prior to installation of the dual containment system with a cured in place pipe, a folded and formed pipe or a diameter reduction pipe, or any other acceptable rehabilitation process.

A substantially-crush resistant annular spacer utilized in accordance with the preferred embodiment of the invention includes substantially parallel and spaced apart longitudinal rods which are held in position by a plurality of ribs which cross the longitudinal elements at an angle and assure communication between the longitudinal rods of any leakage that enters the space between the pipes. The spacer can be readily folded to surround the new primary containment pipe. The space between the longitudinal rods is particularly well-suited to permit installation of a leak detection system along the length of the conduit lined with the dual containment system. The spacer also permits use of a cured in place, folded and formed, diameter reduction, or any other acceptable rehabilitation process primary containment pipe in the dual containment system. When cured in place liners are utilized in the dual containment system as the new primary containment system, an impervious membrane is positioned between the cured in place pipe and the spacer to prevent migration of resin into the space. The dual containment system may be installed in a variety of ways well known in the art.

Figure 1:
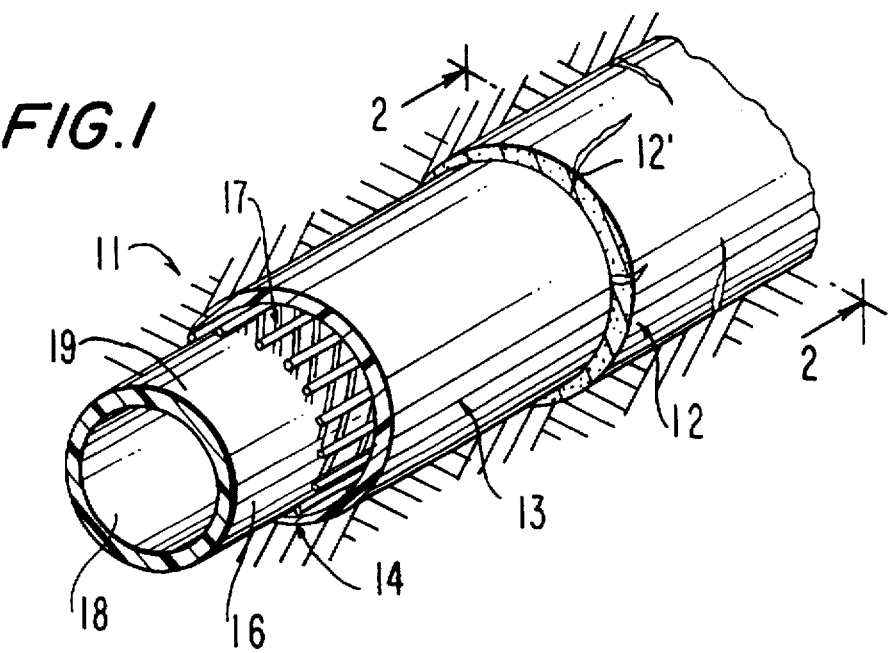
FIG. 1 is a perspective view of a dual containment pipe system constructed and arranged in accordance with an embodiment of the invention.

FIG. 1 illustrates a dual containment pipe system, illustrated generally as 11, in accordance with the invention which has been installed in an existing conduit 12 which is found to be in need of repair due to the presence of cracks 12'. Dual containment pipe system 11 includes a new secondary containment pipe 13 and an spacer 14 disposed about a new primary containment pipe 16. A uniform space 17 is created between primary containment pipe 16 and new secondary containment pipe 13. This is shown in cross-section in FIG. 2.

Figure 3:
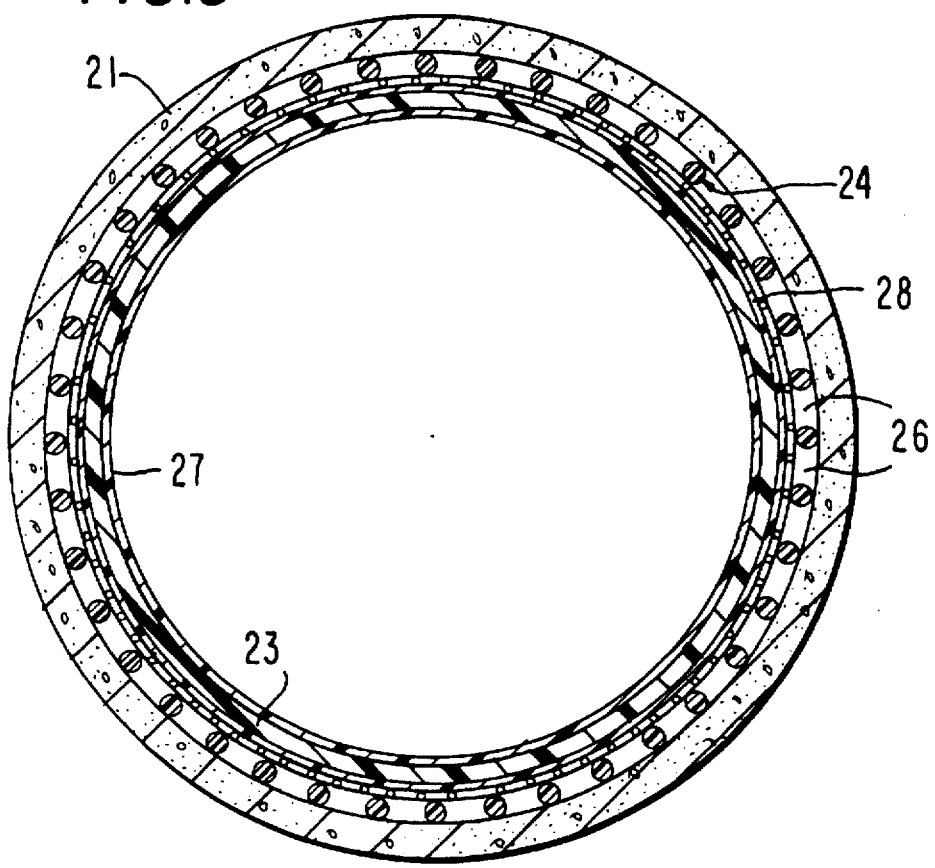
FIG. 3 is a cross-sectional view of a dual containment system of the type illustrated in FIG. 1 when the original conduit does not require repair.

When a host pipe 21 is sound as in FIG. 3, the original conduit would not need to be repaired and a new secondary containment pipe is not needed. The existing host pipe 21 becomes the secondary containment pipe. In this case a dual containment system 22 in accordance with the invention involves installation of only a new primary containment pipe 23 and an spacer 24 to create a uniform space 26 between new primary containment pipe 23 and secondary containment host pipe 21.

Referring to FIG. 1, new primary containment pipe 16 may be any of a variety of containment pipes conventionally used for relining or rehabilitating conduits without excavating. When pipe 16 is a cured in place flexible liner, such as Insituform®, a tube formed of a felt or other resin absorbing material as is well known in the art maybe provided on its outer side with a impermeable coating 18 which after eversion becomes the inner surface of primary containment tube 16. An impervious membrane 19 is provided on the outer surface of the installed primary pipe to prevent resin which is impregnated into the resin absorbing material of pipe 16 from migrating into annular space 17. Impervious layer 18 when provided as a coating, provides a smooth inner surface for new primary containment tube 16. Similarly, a new primary containment tube 23 in FIG. 3 when it is of the cured in place type will have an outer impervious membrane 28 and may also have an inner impermeable coating 27.

Figure 4:
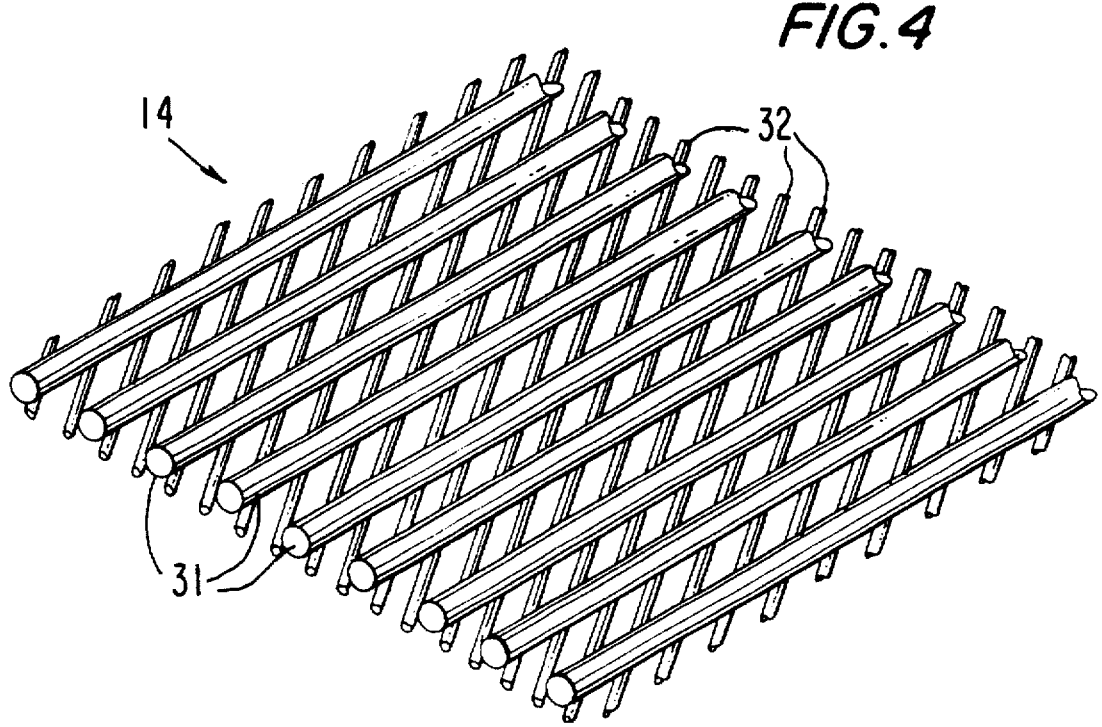
FIG. 4 is a perspective view of a section of spacer can be utilized in the preferred dual containment system of FIGS. 1-3.
Figure 6:
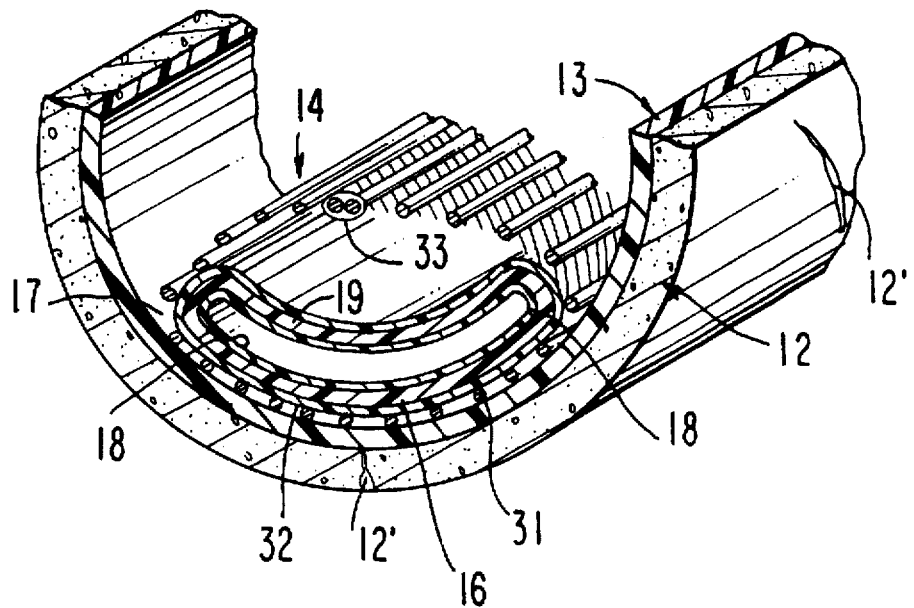
FIG. 6 is an illustration showing installation of a cured in place primary containment tube wrapped in an spacer being pulled into the conduit in accordance with the invention.

The details of a spacer 14 in accordance with a preferred embodiment of the invention are shown in detail in FIG. 4. Spacer 14 is formed from a plurality of longitudinal rods 31 which are provided in a length comparable to the length of the pipeline or conduit to be lined with the dual containment system in accordance with the invention. A plurality of parallel spaced apart connecting ribs 32 which are more flexible and smaller in size than rods 31 are bonded to rods 31 to create a mesh which is sufficiently flexible to be wrapped about a new primary containment tube or pipe. The edges of wrapped spacer 14 can then be secured together using a suitable fastening method, such as stitching 33 as shown in FIG. 6 to fasten the edges of spacer 14 together. Alternatively, spacer 14 may be joined by any convenient means, such as with clips or tied with wire.

Figure 7:
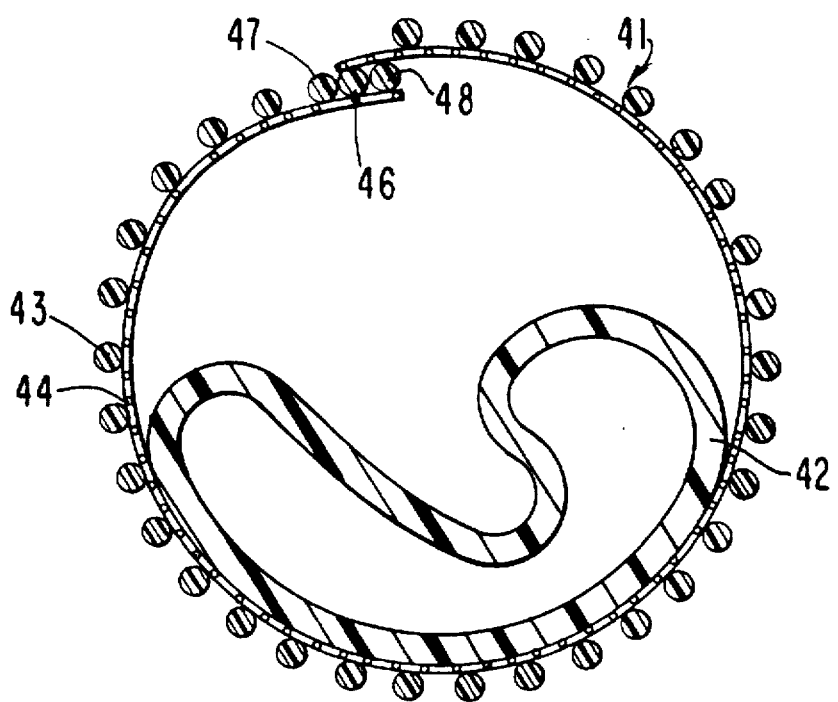
FIG. 7 is a cross-section of a formed and folded primary containment pipe with the spacer disposed thereabout during installation of a dual containment system in accordance with the invention.

Referring to another embodiment illustrated in FIG. 7, a spacer 41 is shown wrapped about a new primary containment pipe 42 which is a folded and formed pipe. Spacer 41 is formed with a plurality of longitudinal rods 43 on the outer surface of a plurality of crossing ribs 44 as in FIG. 4. In this embodiment an end rod 46 at one edge of spacer 41 is placed on the inside of parallel ribs 44. When spacer 41 is fabricated in this manner, after it is cut to the proper width and wrapped about new primary containment tube or pipe 42, end rod 46 conveniently slips between the two end rods 47 and 48 at the opposite edge of spacer 41.

Figure 8:
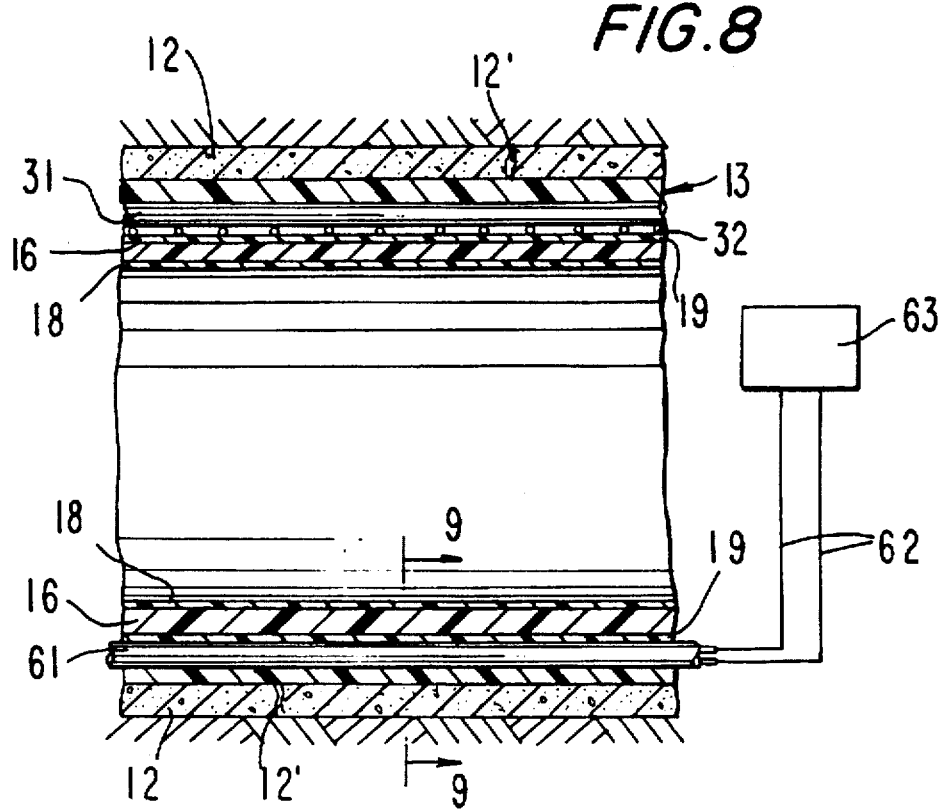
FIG. 8 is a cross-sectional view along the length of a conduit in which the dual containment pipe system including a new secondary containment pipe in accordance with the invention has been installed together with a leakage detection system.
Figure 9:
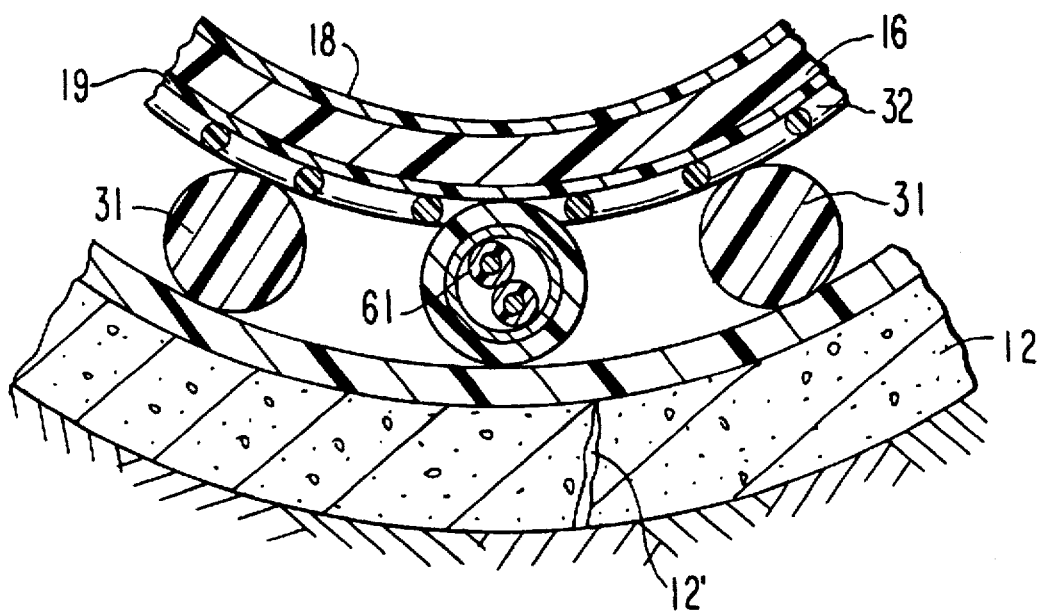
FIG. 9 is a cross-sectional view of the dual containment lined system of FIG. 8 taken along line 9—9.
Figure 10:
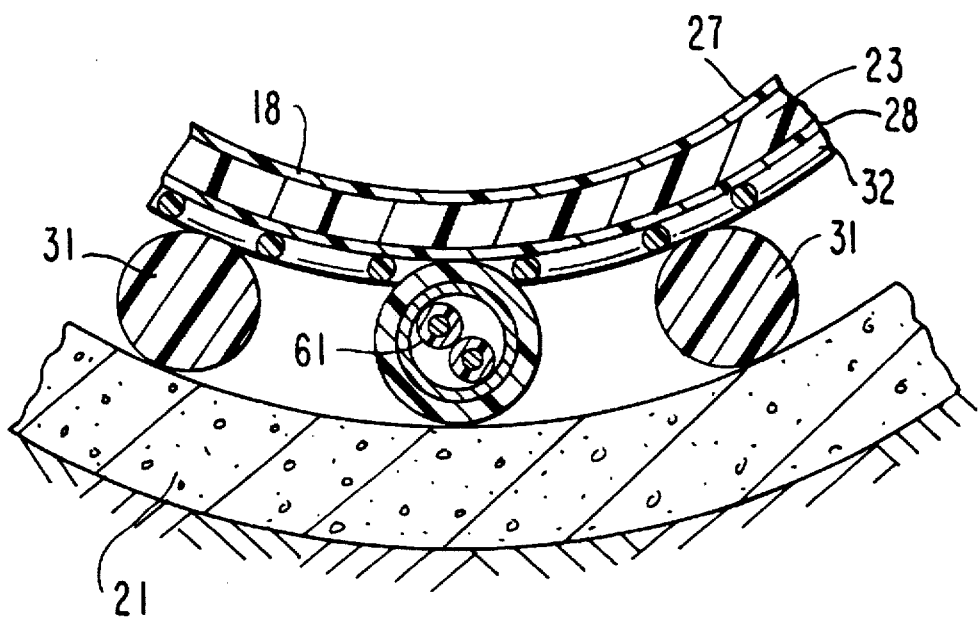
FIG. 10 is a cross-sectional view of a section of a length of a conduit including a dual containment pipe system including a new primary containment pipe only with a leakage detection system in accordance with the invention.

Referring now to FIG. 4, longitudinal rods 31 are spaced apart a substantially uniform distance to create a space between rods 31. The space between rods 31 is particularly well-suited for receipt of an elongated sensing element for detecting leaks in the form of a cable which is positioned along the length of space where the presence of fluid is to be detected. The cable is electrically connected to an external control and indicating system which informs an operator of the existence and location of leaks. Installation of such a leakage detection system is shown in FIGS. 8–10 which will be described in more detail below. The space is also well-suited for installation of leak detection systems based on pressure differential, or manual observation.

Figure 5:
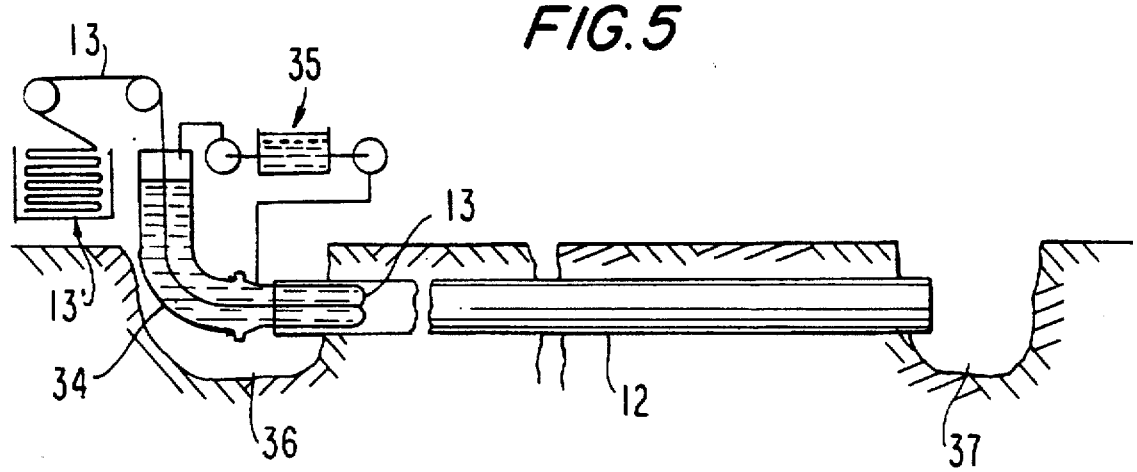
FIG. 5 is a perspective view illustrating installing a resin impregnated flexible cured in place liner to repair the existing conduit prior to installation of the dual containment system in accordance with the invention; the installation of the primary containment by eversion is done in the same manner.

When existing conduit 12 is not sound, it may first be repaired by use of a cured in place flexible liner 13 as shown in FIG. 5. Liner 13 is the type disclosed in U.S. Pat. No. 4,009,063 and No. 4,064,211. Liner 13 may be pulled into place or everted, and radial pressure is applied to the interior of liner 13 to press it outwardly into engagement with the inner surface of existing conduit 12.

In the method of installation illustrated in FIG. 5, impregnated flexible liner 13 supplied in a folded condition 13' is fed through a supply pipe 34 into existing conduit 12. Supply pipe 34 is filled with water by a pump 35 to force resin impregnated tube 13 out of the lower end of supply pipe 34 into existing conduit 12, turning it inside out from an upstream manhole 36 to a downstream manhole 37. After curing the resin by any known means, such as by application of heat, various forms of radiation, ultrasonics or other means, flexible liner 13 becomes the new secondary containment pipe 13 illustrated in FIGS. 1 and 2. Multiple inflation liners may also be used as described in U.S. Pat. No. 5,407,630, assigned to the assignee herein and incorporated by reference. Alternatively, the new secondary containment or replacement pipe may be a substantially rigid folded and formed pipe of the type illustrated in U.S. Pat. No. 4,867,921, or the diameter reduction type, or any other acceptable rehabilitation pipe.

Referring to FIG. 6, dual containment pipe system 11 of FIG. 1 is illustrated as new primary containment pipe 16 and spacer 14 are being pulled into host conduit 12 which has been repaired with a new secondary containment pipe 13 of the cured in place type. In this illustration new primary containment pipe 16 has outer impermeable membrane 19 to prevent migration of resin into space 17 to be formed. An appropriate width of spacer 14 formed of rods 31 and crossing ribs 32 is wrapped about new primary containment pipe 16 and is joined together by a plurality of stitches 33. Spacer 14 and new primary containment pipe 16 are then pulled into conduit 12 by a rope coupled to a downstream winch. After primary containment pipe 16 and spacer 14 are in place, fluid is fed into the inside of pipe 16 to force it against spacer 14 so that dual containment system 11 in accordance with the invention takes up the interior configuration of original conduit 12 as in the case of installation of new secondary containment pipe 13 described in connection with FIG. 5.

When new primary containment pipe 16 is a cured in place flexible liner impregnated with resin, the resin is cured by any suitable means, such as by hot water, by light radiation, ultrasonics or other means. Once the resin is cured, a rigid pipe lining having substantially the flow capacity of the original conduit 12 is formed. A uniform space determined by the dimension of longitudinal rods 31 of spacer 14 is formed. The space between rods may then be utilized for receipt of the leak detection system. New primary containment pipe 16 may also be rounded utilizing a second inflation tube which may be subsequently stripped out, or if impregnated with a curable resin can be everted with the external felt liner as described in U.S. Pat. No. 5,407,630.

FIG. 6 illustrates in cross-section the impregnated new primary containment pipe 16 as it is installed in conduit 12 prior to rounding. At this time pipe 16 which is formed of a resin impregnated absorbent material, such as a polyester felt is a soft and flexible tube. Impervious film or layer 19 is utilized to prevent migration of resin from the resin absorbent material to the space between rods 31 of spacer 14.

Figure 2:
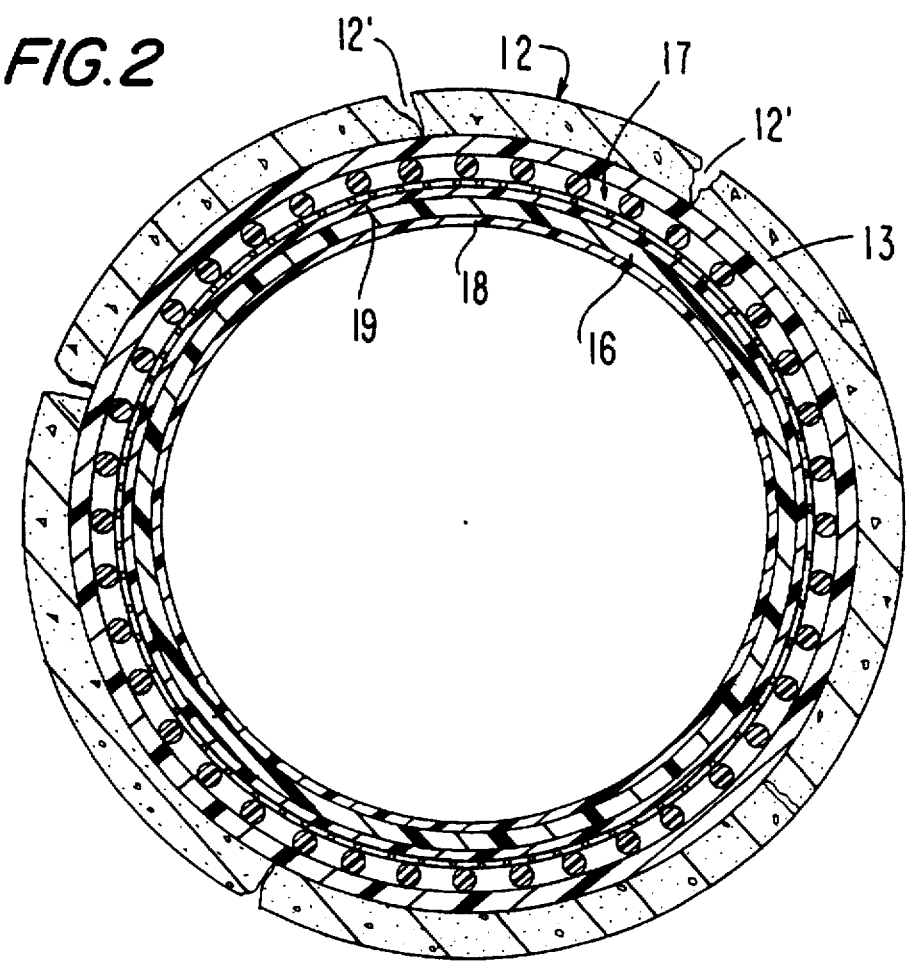
FIG. 2 is a cross-sectional view of the dual containment system illustrated in FIG. 1.

In FIG. 8 a fluid detection system cable 61 installed with dual containment pipe system 11 in existing conduit 12 with cracks 12' of FIG. 1. Detection system cable 61 is connected by means of wires 62 to an external control and indicating station 63. Dual containment system 11 include new secondary containment pipe 13 as illustrated in FIGS. 1 and 2. FIG. 9 is a cross-section view showing leak detection cable 61 between rods 31.

FIGS. 10 shows a section of the same leak detection system as in FIGS. 8 and 9, but where host pipe 21 was not in need of repair.

Leak detection maybe accomplished by several methods, such as by installation of an elongated leak detection cable system described above. Alternatively, both ends of the uniform space maybe sealed and either a pressure or vacuum is placed on said space, so that when a leak occurs, a change in pressure is detected. In another detection system, the upstream end of the uniform space may be sealed, and an opening at the downstream exit allows observation of any leaks between the upstream end and the downstream exit. In any of these methods, the detection system indicates the location of the leak.

A dual containment pipe system prepared in accordance with the invention provides many advantages. Of primary importance is a substantially uniform space which is created in situ during installation. Communication between the elongated rods or rails of the spacer provide a space for installation of an elongated leak detection cable system. The elongated rods assures that any leakage which occurs any where around the circumference of the primary pipe will report to the detection means. Accordingly, the dual containment pipe system prepared in accordance with the invention is particularly well-suited for rehabilitation of pipelines utilized to carry environmentally dangerous materials such as a wide variety of chemicals and petroleum materials. Leaks caused by breakage in the pipe system will be readily detected by the leak detection system which extends the full length of the retrofitted conduit.

The dual containment system formed utilizing a substantially non-crushable spacer in accordance with the invention makes the system applicable to a wide variety of types and sizes of liners suitable for pipeline rehabilitation. These include the soft and flexible cured in place liners, substantially rigid folded and formed liners, diameter reduction pipe, or any of the other conventional systems for rehabilitation of existing conduits.

The spacer utilized in the preferred embodiments of the invention described herein is available as Tensar drainage net from Netlon Ltd. in Blackburn, England. This has been illustrated for purposes of example only and is not set forth on a limiting sense. An important feature of such a spacer is its crush resistance and provision of communication in the space between the rods as well as between the connecting ribs. The drainage net is a high-profile, crush-resistant, high flow capacity mesh formed from high density polyethylene. It is conventionally utilized to replace traditional sand or gravel layers in landfill applications. The drainage net finds particular useful application in the dual containment pipe system described herein because the net is sufficiently flexible to surround a new containment pipe because the connecting ribs are sufficiently flexible. The elongated longitudinal rails are also more rigid, but sufficiently flexible to be fed into the conduit to be relined without requiring excavation. Rounding of the new containment pipe pressurizes the spacer to form the uniform space between the new primary containment pipe and the original conduit or new secondary containment pipe in the repaired conduit. This provides a new secondary containment pipe having substantially the same capacity as the original conduit.

It will thus be seen that the objects set forth above, among those made apparent from the preceding description, are efficiently attained and, since certain changes may be made in carrying out the method and in the pipe set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might said to fall therebetween.

What is claimed is:

1. A dual containment pipe system suitable for installation into an existing secondary containment conduit of a given length, comprising an impervious primary containment pipe which is adapted to be installed in the existing secondary containment conduit and after installation is configured to conform to the interior configuration of the secondary containment conduit, and substantially crush-resistant spacer means disposed about the entire external circumference and along substantially the entire length of the primary containment pipe for maintaining the primary and secondary containment pipe substantially coaxial by forming a substantially uniform space between the primary containment pipe and the secondary containment conduit after installation of the primary containment pipe.

2. The dual containment pipe system of claim 1, further including a new impervious secondary containment pipe installed in the existing conduit wherein the space is formed between the primary containment pipe and the secondary containment.

3. The dual containment pipe system of claims 1 or 2, wherein the spacer means includes longitudinal elements extending along the axis of the primary containment pipe to form longitudinally extending spaces between the elements for providing communication along the length of the system.

4. The dual containment pipe system of claim 3, further including substantially parallel connecting members disposed at an angle to and crossing the longitudinal members for providing communication between the longitudinally extending elements and disposed about the entire external circumference of the primary containment pipe.

5. The dual containment pipe system of claims 1 or 2, further including leak detection means disposed in the space between the primary and the secondary containment pipes.

6. The dual containment pipe system of claims 1 or 2, further including leak detection means for detecting leaks in the pipe system, including pressure differential means for measuring pressure differences along the length of the length of said space between said pipes.

7. The dual containment pipe system of claims 1 or 2, further including leak detection means for detecting leaks in the primary containment pipe which includes a sealed space between the primary and the secondary containment pipes at the upstream end of the secondary containment conduit and an opening at a downstream exit to observe the presence of any leaks within the pipe system between the upstream end and the downstream exit.

8. The dual containment pipe system of claim 1, wherein the impervious primary containment pipe is a cured in place pipe.

9. The dual containment pipe system of claim 2, wherein the new impervious secondary containment pipe and the impervious primary containment pipe are cured in place pipes.

10. The dual containment pipe system of claims 8 or 9, wherein the cured in place pipe includes an impervious membrane on the surface facing the spacer means.

11. The dual containment pipe system of claim 1, wherein the impervious containment pipe is a substantially rigid folded and formed pipe.

12. The dual containment pipe system of claim 1, wherein the impervious containment pipe is a substantially rigid diameter reduced pipe.

13. A dual containment pipe system suitable for installation into an existing conduit of a given length, comprising an impervious primary containment pipe which is adapted to be installed in an existing conduit and after installation is configured to conform to the interior configuration of the existing conduit, and a substantially crush-resistant spacer formed of a plurality of spaced apart and substantially parallel longitudinal members of a selected length, and a plurality of spaced apart substantially parallel flexible connecting ribs disposed at an angle to and crossing the longitudinal members, the connecting ribs and longitudinal members being bonded together, the spacer element disposed about the entire external circumference of the containment pipe maintaining the primary containment pipe substantially coaxial with the existing conduit, the longitudinal elements forming a plurality of longitudinally extending spaces along the length of the system for providing communication along the length of the system and the connecting ribs forming at least one channel for communicating about the entire external circumference of the pipe system.

14. The dual containment pipe system of claim 13, further including an impervious secondary containment pipe installed in the existing conduit and the annular space formed between the new primary containment pipe and the secondary containment pipe with the annular space therebetween.

15. The dual containment pipe system of claims 13 or 14, further including leak detection means disposed in the space between the longitudinal elements along the length of the conduit.

16. The dual containment pipe system of claims 13 or 14, further including leak detection means for detecting leaks in the pipe system including pressure differential means for measuring pressure differences along the length of said space.

17. The dual containment pipe system of claims 13 or 14, further including leak detection means for detecting leaks in the pipe system which includes a sealed space between the first and second containment pipes at the upstream end of the secondary containment conduit and an opening at a downstream exit to observe the presence of any leaks within the pipe system between the upstream end and the downstream exit.

18. The dual containment pipe system of claim 13, wherein the impervious containment pipe is a cured in place pipe.

19. The dual containment pipe system of claim 14, wherein the new impervious secondary containment pipe and the new impervious primary containment pipe are cured in place pipes.

20. The dual containment pipe system of claims 18 or 19, wherein the cured in place primary containment pipe includes an impervious membrane on the surface facing the annular spacer.

21. The dual containment pipe system of claim 13, wherein the impervious primary containment pipe is a substantially rigid folded and formed pipe.

22. The dual containment pipe system of claim 13, wherein the impervious primary containment pipe is a substantially rigid diameter reduced pipe.

* * * * *